US012461827B1

(12) United States Patent
Natanzon et al.

(10) Patent No.: US 12,461,827 B1
(45) Date of Patent: Nov. 4, 2025

(54) SYSTEM AND METHOD FOR BACKUP AND RESTORATION OF A VIRTUAL-HOSTED DATABASE SYSTEM

(71) Applicant: Eon IO, Ltd., Tel Aviv (IL)

(72) Inventors: Assaf Natanzon, Tel Aviv (IL); Yaniv Ptashnik, Tel Mond (IL); Dmitry Kuznetsov, Tel Aviv Yafo (IL); Ofir Ehrlich, Tel Aviv (IL); Peleg Kazaz, Tel Aviv (IL); Ron Kimchi, Tel Aviv (IL); Ran Mizrachi, Mishmar Hashiva (IL); Sigal Weiner, Holon (IL)

(73) Assignee: Eon IO, Ltd., Tel Aviv (IL)

( * ) Notice: Subject to any disclaimer, the term of this patent is extended or adjusted under 35 U.S.C. 154(b) by 0 days.

(21) Appl. No.: 18/940,434

(22) Filed: Nov. 7, 2024

(51) Int. Cl.
*G06F 11/14* (2006.01)
*G06F 9/455* (2018.01)

(52) U.S. Cl.
CPC ...... *G06F 11/1469* (2013.01); *G06F 9/45558* (2013.01); *G06F 11/1464* (2013.01); *G06F 2009/45583* (2013.01); *G06F 2201/80* (2013.01)

(58) Field of Classification Search
None
See application file for complete search history.

(56) References Cited

U.S. PATENT DOCUMENTS

| | | | |
|---|---|---|---|
| 7,840,539 B2 | 11/2010 | Mooney et al. | |
| 7,949,640 B2 | 5/2011 | Holenstein et al. | |
| 8,190,572 B2 | 5/2012 | Anguelov | |
| 8,903,779 B1 | 12/2014 | Holenstein et al. | |
| 11,880,386 B1 | 1/2024 | Hoffmann et al. | |
| 2018/0365110 A1* | 12/2018 | Venkatesh | G06F 9/54 |
| 2020/0341852 A1* | 10/2020 | Chopra | G06F 11/1451 |
| 2022/0245033 A1* | 8/2022 | Zou | G06F 11/1464 |

* cited by examiner

*Primary Examiner* — Eddy Cheung
(74) *Attorney, Agent, or Firm* — M&B IP Analysts, LLC (57) ABSTRACT

A system and method for the device may include accessing a database application hosted on a virtual machine, the virtual machine deployed in a computing environment. In addition, the device may include exporting data stored in the database application to a plurality of files, each file utilizing a column-oriented storage format; generating a virtualization backup only of the virtual machine; and generating a data backup of the database application based on the plurality of files.

33 Claims, 7 Drawing Sheets

SYSTEM AND METHOD FOR BACKUP AND RESTORATION OF A VIRTUAL-HOSTED DATABASE SYSTEM

TECHNICAL FIELD

The present disclosure relates generally to digital backup and restoration, and specifically to performing backup and restoration of databases installed on virtualizations in computing environments.

BACKGROUND

Database backup is the process of creating copies of data to protect against data loss, corruption, or hardware failure. Backups ensure that information can be restored if something goes wrong, maintaining data availability and minimizing downtime. There are several types of backups used to meet different recovery needs. A full backup captures the entire database, offering a complete snapshot at a specific point in time. Incremental backups, on the other hand, store only the changes made since the last backup, making them more space-efficient but requiring all previous backups for a full restore. Differential backups store changes made since the last full backup, striking a balance between efficiency and ease of recovery.

Backup strategies play a critical role in deciding how often backups are taken and where they are stored. A common approach is the 3-2-1 strategy, which involves keeping three copies of data: the original plus two backups, with one stored offsite. In production environments, backups may occur at varying intervals—such as daily or weekly—depending on the organization's tolerance for data loss and downtime, often referred to as the Recovery Point Objective (RPO) and Recovery Time Objective (RTO). For high-demand systems, continuous or near-real-time backups, known as transaction log backups, are used to ensure minimal data loss. Additionally, automated backups in the cloud have become increasingly popular, offering scalability and offsite storage by default, which simplifies disaster recovery processes.

However, there are challenges specific to cloud-based backups. One significant issue is latency, where the time taken to transfer large amounts of data to and from the cloud can hinder backup and restoration speed. This can be particularly problematic for large databases that need quick recovery.

To overcome this, some solutions allow fast restoration of a database by doing an instance mount of the database and then querying the mounted database. While such a solution allows a user to access some content of the database, this still typically takes a significant amount of time. Further complicating this, if an incorrect version of the database is restored, a correction can be a long and error-prone process.

In addition, cloud-based databases can be implemented as managed databases, such as Amazon® RDS, or by deploying a virtual machine, such as an Amazon® EC2 instance with a database application installed thereon. Such a machine can include many temporary files which occupy a large amount of storage space. Additionally, an older database backup may utilize a previous version of the database application, such that when it is restored might cause a cybersecurity risk, as an outdated application.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

A system of one or more computers can be configured to perform particular operations or actions by virtue of having software, firmware, hardware, or a combination of them installed on the system that in operation cause(s) the system to perform the actions. One or more computer programs can be configured to perform particular operations or actions by virtue of including instructions that, when executed by a data processing apparatus, cause the apparatus to perform the actions.

In one general aspect, the method may include accessing a database application hosted on a virtual machine, the virtual machine deployed in a computing environment. Method may also include exporting data stored in the database application to a plurality of files, each file utilizing a column-oriented storage format; generating a virtualization backup only of the virtual machine; and generating a data backup of the database application based on the plurality of files. Other embodiments of this aspect include corresponding computer systems, apparatus, and computer programs recorded on one or more computer storage devices, each configured to perform the actions of the methods.

In one general aspect, non-transitory computer-readable medium may include one or more instructions that, when executed by one or more processors of a device, cause the device to: access a database application hosted on a virtual machine, the virtual machine deployed in a computing environment; export data stored in the database application to a plurality of files, each file utilizing a column-oriented storage format generate a virtualization backup only of the virtual machine; and generate a data backup of the database application based on the plurality of files. Other embodiments of this aspect include corresponding computer systems, apparatus, and computer programs recorded on one or more computer storage devices, each configured to perform the actions of the methods.

In one general aspect, the system may include one or more processors configured to. System may also include access to a database application hosted on a virtual machine, the virtual machine deployed in a computing environment. System may furthermore include export data stored in the database application to a plurality of files, each file utilizing a column-oriented storage format. System may in addition include generating a virtualization backup only of the virtual machine. System may moreover include generating a data backup of the database application based on the plurality of files. Other embodiments of this aspect include corresponding computer systems, apparatus, and computer programs recorded on one or more computer storage devices, each configured to perform the actions of the methods.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

Figure 1:
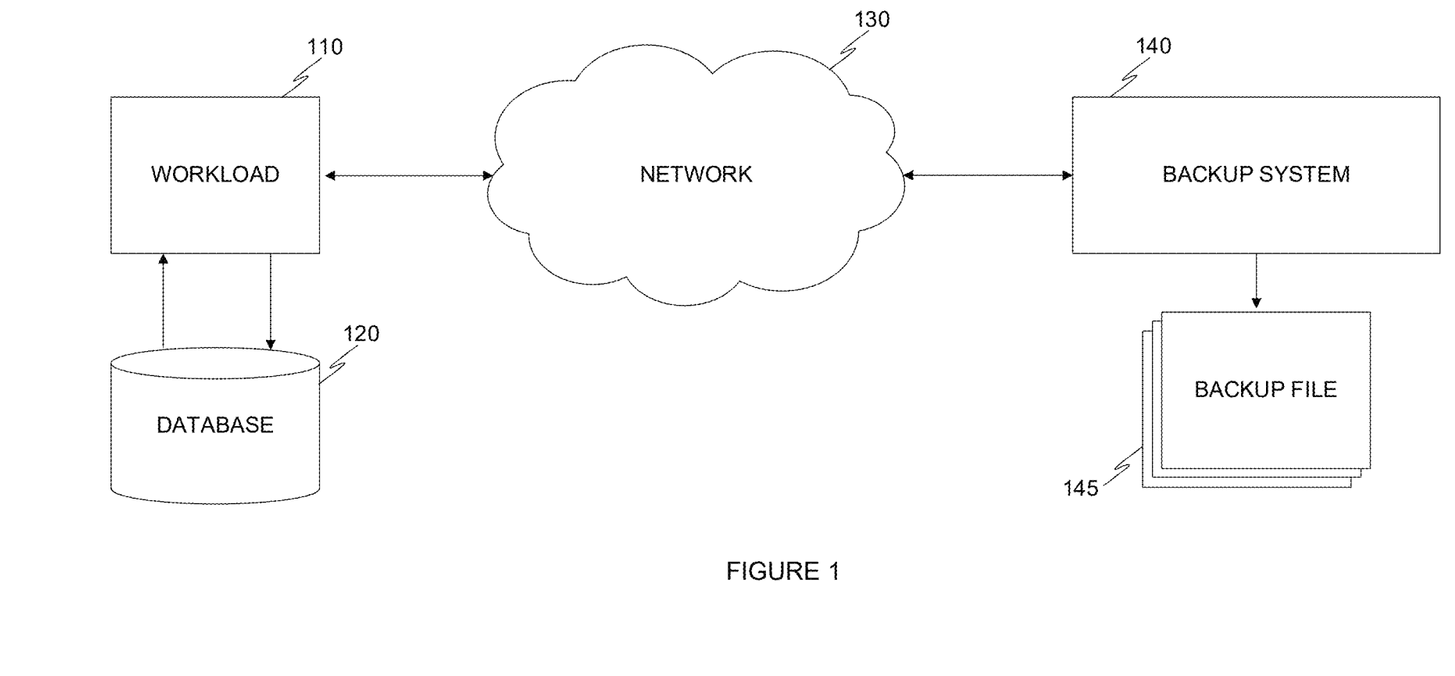
FIG. 1 is an example network diagram including a database backup system, utilized to describe an embodiment.

FIG. 1 is an example network diagram including a database backup system, utilized to describe an embodiment. In an embodiment, a database 120 includes a database application, a database management system (DBMS), a combination thereof, and the like. In some embodiment, the database 120 is a column-oriented database. In an embodiment, the database 120 is a relational database, a tabular relational database, and the like. For example, in an embodiment, the database 120 is implemented using SQL, MySQL, and the like query languages. In an embodiment, the database 120 includes metadata, such as a database schema. In some embodiments, the database schema includes a data structure, such as a table, including a plurality of keys, at least a portion of which correspond to columns of the table.

In certain embodiments, the database 120 is deployed on a workload 110. In an embodiment, the workload 110 is a physical computing device, a virtual computing device (e.g., a virtual machine), a combination thereof, and the like. In some embodiments, the workload 110 is a software container. In an embodiment, a software container is deployed on a software container platform, such as Kubernetes®, Docker®, and the like.

According to an embodiment, the workload 110 is implemented as a virtual machine, a software container, a serverless function, a combination thereof, and the like. In some embodiments, the database 120 is implemented as a managed database, for example utilizing Amazon® RDS. In an embodiment, a virtual machine is deployed as an Amazon® EC2 instance. A software container is deployed, according to an embodiment, on a container platform such as Kubernetes®, Docker®, and the like. In some embodiments, a serverless function is deployed as an Amazon® Lambda function.

In an embodiment, the workload 110 is configured to provide access to the database 120, for example over a network 130. In some embodiments, a cloud computing infrastructure is implemented on the network 130. For example, in an embodiment, a cloud computing infrastructure is Amazon® Web Services (AWS), Google® Cloud Platform (GCP), Microsoft® Azure, and the like. In certain embodiments, the cloud computing infrastructure is utilized to deploy a cloud computing environment. In an embodiment, a cloud computing environment is a virtual private cloud (VPC), a virtual network (VNet), a virtual private network (VPN), a combination thereof, and the like.

In some embodiments, the workload 110 is configured to provide access to the database 120 to a database backup system 140 (also referred to as backup system 140). In an embodiment, the backup system 140 is configured to generate a backup of the database 120. In an embodiment, the database system 140 is implemented as a virtual machine, a software container, a serverless function, a combination thereof, and the like.

In an embodiment, the backup system 140 is configured to generate a backup of a database by determining a primary key of the database 120. In some embodiments, the database backup includes a data backup and a machine backup. For example, according to an embodiment, the data backup includes only data of the database. In some embodiments, only data of the database includes data exported from the database, a database schema, a combination thereof, and the like.

In an embodiment, the machine backup includes data, information, and the like, which allows generation of a restored machine (i.e., a restored virtualization) which is configured to host a database application capable of exposing the data restored from the data backup. In an embodiment, the machine is a virtualization instance such as a virtual machine, a software container, a serverless function, a combination thereof, and the like.

According to an embodiment, data, information, and the like that allow the generation of a restored machine include a filesystem, a directory, a registry, configuration information, software product keys, a combination thereof, and the like. For example, according to an embodiment, machine backup includes an identifier of an operating system (such as Windows®, Linux®, etc.), an identifier of a database application (e.g., Apache® Derby), a filesystem, a registry file, a configuration file, a combination thereof, and the like.

In some embodiments, generating a machine backup is performed by mounting the file system of a virtual machine which hosts the database application, and generating a file-level backup which omits log files, table files, and the like data files of the database application. For example, in an embodiment, a file-level backup includes generating a storage-based snapshot of the virtual machine, i.e., a snapshot of at least a block device attached to the virtual machine, mounting the snapshot to a second virtual machine, and exporting data from the second virtual machine into a data backup. In an embodiment, exporting data includes executing a plurality of queries on a database application of the second virtual machine, where each query returns a plurality of rows of data from the database. Such data exportation from a database is discussed in more detail with respect to FIG. 3 below.

In an embodiment, generating a machine backup includes generating a block-level backup of a virtual machine on which the database application is deployed. In some embodiments, data blocks which include data of the database are released, so that they are not stored as part of the machine backup. This ensures that a block-level backup of the machine only is generated, without any of the data of the database application, the latter stored separately as a database data backup.

According to an embodiment, at least a file which includes database data is zeroed out, punched out, etc., prior to generating a machine backup (i.e., a backup of a state of the virtual machine without any of the data of the database). In some embodiments, it is advantageous to drop a table from a database application on a restored virtual machine prior to inserting the backed-up data. In an embodiment, dropping a table from a database application includes erasing all records (i.e., all data rows), deleting indexes, triggering permissions, etc., breaking foreign key constraints, releasing storage space assigned to the table, a combination thereof, and the like. In some embodiments, metadata of the database application is stored as part of the machine backup. In an embodiment, metadata includes a store procedure, a view, a schema, a combination thereof, and the like.

In certain embodiments, generating a machine backup includes detecting software applications deployed, executed, etc., on the workload 110 and storing a product key for each detected application. For example, in an embodiment, Apache® Derby is detected on the workload 110, and a product key for Derby is stored as a portion of the machine backup.

In an embodiment, when restoring the machine (e.g., the workload 110) from the machine backup, the product key is accessed, and a new installation of Apache® Derby is deployed on the restored machine. In an embodiment, restoring a machine includes configuring an orchestrator of a cloud computing environment to deploy a virtual machine (e.g., an Amazon® EC2) in a cloud computing environment.

In certain embodiments, storing such product keys is advantageous as it allows for generating a machine with software applications which are up to date. This in turn reduces the risk of a cybersecurity breach due to vulnerable versions of software which can be deployed from a more straightforward database backup. This is a clear advantage of creating separate backups for the database data and the database software application (i.e., the machine backup).

In some embodiments, detecting a product key includes scanning a virtual machine, a disk of the virtual machine, and the like, to detect thereon a stored product key. In some embodiments, a product key is detected by accessing a registry of a machine, workload, virtual instance, and the like, and reading therefrom a product key, a plurality of product keys, and the like. In some embodiments, the product key is associated with an identifier of a software application. In certain embodiments, a software repository is determined, from which a software application can be downloaded, installed, etc., on a virtualization, based on the product key. For example, in some embodiments, an orchestrator is provided with a product key when instructed to deploy a virtualization, and a software application is selected from a software repository accessible to the orchestrator.

In some embodiments, the backup system 140 is configured to generate a restored database. In an embodiment, the backup system 140 is configured to restore a machine backup into an operational machine (e.g., a virtual machine deployed in a cloud computing environment) and is further configured to restore database data into the restored (i.e., operational) machine, for example by utilizing the methods described in more detail herein, which results in a restored database.

In an embodiment, the backup system 140 is configured to generate a data backup based on the data stored in database 120. In certain embodiments, the data backup includes a plurality of backup files 145. In an embodiment, the backup files 145 are a plurality of data files, stored each as a column-oriented data file. A column-oriented data file is, for example, Apache® Parquet. In an embodiment, values of each column of the database are stored in serial, contiguous, and the like, memory locations, which allows several benefits, such as improved column-wise compression and reduced query execution processing by reading only the column and not an entire row of data, where the contents of the row may not be relevant to the query.

In an embodiment, the backup system 140 is configured to determine a primary key of the database. In some embodiments, the backup system 140 is configured to generate a plurality of queries based on the primary key, each query returning a plurality of rows of data from the database. In an embodiment, the plurality of rows are stored as at least a column-oriented data file, e.g., the backup files 145.

According to an embodiment, a primary key is a database key which includes values which are unique for each row. For example, a primary key is, in an embodiment, an index value. As no two rows can have the same index value, an index value can be used as a primary key. In some embodiments, a primary key is a composite key, i.e., a combination of a key value of a first column and a key value of a second column, which together form a unique value.

Figure 2:
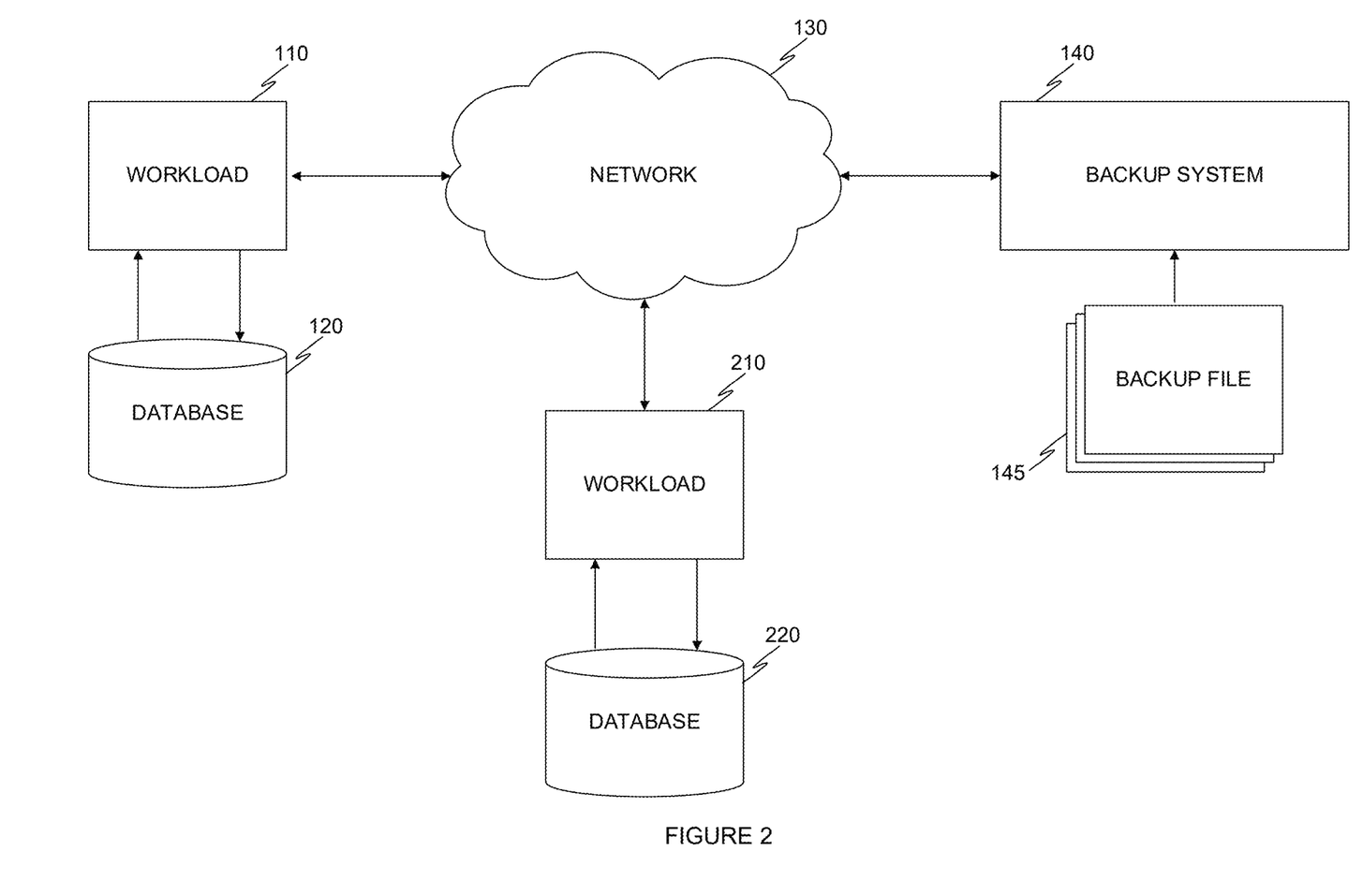
FIG. 2 is an example network diagram of a backup system performing a database restoration, utilized to describe an embodiment.

FIG. 2 is an example network diagram of a backup system performing a database restoration, utilized to describe an embodiment. According to an embodiment, a backup system 140 is configured to receive a request to restore a database application, including the database data thereof.

In an embodiment, the backup system 140 is configured to instruct an orchestrator (not shown), other provisioning device, and the like, to deploy a restored workload 210, which corresponds to the workload 110. For example, in an embodiment, the restored workload is deployed from an auto-scaling group (ASG) which is deployed in a VPC of a cloud computing environment.

In some embodiments, the backup system 140 is configured to restore the restored workload 210 based on a file-level backup, a block-level backup, a plurality of software keys, and the like. For example, in an embodiment, the backup system 140 is configured to generate, provision, etc., an empty bootable machine volume. In an embodiment, a bootable machine volume is implemented utilizing Amazon® Elastic Block Storage (EBS).

In some embodiments, data of the backup files 145 is copied into the database 220. In certain embodiments, the workload 210 is configured to query the backup files 145 while the data of the backup files 145 is being written, copied, etc., to the database 220. This provides access to the data while performing the restoration.

For example, according to an embodiment, a database application of the database 220 is configured to receive a query for execution thereon. In an embodiment, the database application is configured to execute the query on the backup data files 145 in response to determining that the backup data files 145 have not yet been completely written to the database 220.

Figure 3:
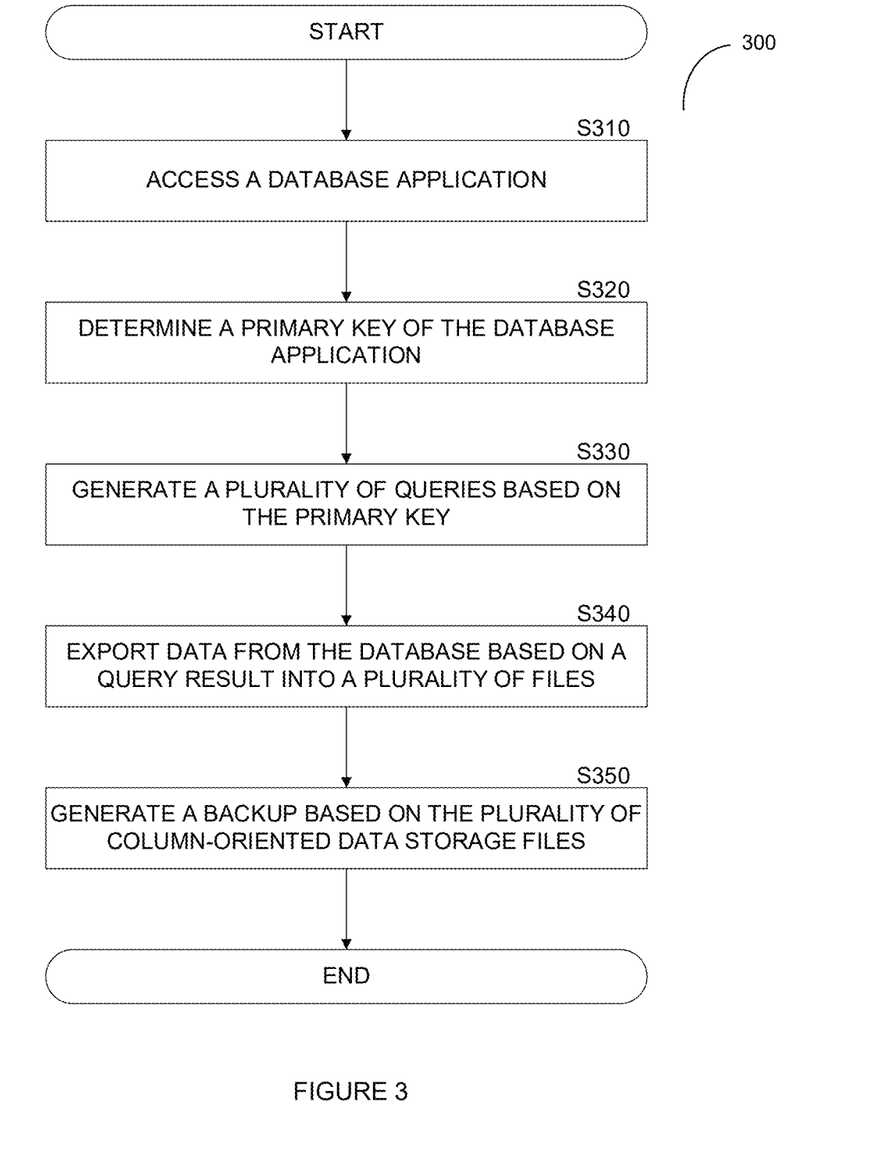
FIG. 3 is an example flowchart of a method for generating a database backup, implemented in accordance with an embodiment.

FIG. 3 is an example flowchart 300 of a method for generating a database backup, implemented in accordance with an embodiment. The method may be performed by the backup system 140. In an embodiment, generating a database backup includes generating a backup of the machine hosting the database (which omits the data of the database) and generating a backup of the data of the database as two distinct backups.

At S310, a database application is accessed. In an embodiment, accessing a database application includes detecting a database application deployed in a computing environment, such as a cloud computing environment. According to some embodiments, accessing a database application includes receiving a token, a credential, a combination thereof, and the like, to access the database. In an embodiment, accessing the database application includes accessing a machine, a workload, and the like, on which the database application is deployed.

According to certain embodiments, the database application is a stand-alone database application deployed on a virtual machine. In an embodiment, a stand-alone database application is, for example, PostgreSQL, SQLite, MySQL, Oracle® Database, and the like.

At S320, a primary key of the database is determined. In an embodiment, the primary key is overridden, for example by a user input. In some embodiments, the primary key is an index of rows, for example. In an embodiment, the primary key includes a value assigned to each row, which is a unique value, such that no two rows include the same value of the primary key.

In some embodiments, a primary key is generated based on a composite of multiple-column identifiers. For example, in an embodiment, two identifiers, each of a distinct column, form together a primary key. In certain embodiments, a plurality of primary keys are selected, each primary key corresponding to a table of the database.

At S330, data is exported from the database. In an embodiment, exporting data from the database includes generating a plurality of queries. In an embodiment, the plurality of queries are generated, each based on a value range of the primary key. For example, in an embodiment, a first query of the plurality of queries is generated based on a value range of '0' to '10,000' of the primary key, and a second query of the plurality of queries is generated based on a value range of '10,001' to '20,000'. In an embodiment, there is no overlap between the values of the primary key for each of the generated queries. In an embodiment, the query is generated in a query language, such as SQL.

In an embodiment, data is exported from the database utilizing a logical backup. For example, in a PostgreSQL database, a pg_dump command is utilized to export data from a database application to a logical backup. According to an embodiment, a logical backup includes schema and data as query language (e.g., SQL) commands, binary format, and the like. In an embodiment, a logical backup is a consistent snapshot, as opposed to a physical backup, which includes, for example, configuration files, raw files, directories, etc.

At S340, a plurality of files are generated. In an embodiment, the plurality of files are generated in a column-oriented data format, such as Apache® Parquet. In some embodiments, the plurality of files are generated such that a file, a group of files, etc., corresponds to a result of executing a query of the plurality of queries. Thus, data is exported from the database into a plurality of data files.

In an embodiment, data is exported from the database application into the plurality of files by generating the plurality of queries, executing each query on the database, receiving a result for each query, and storing the results as a plurality of data files in a column-oriented data format.

In some embodiments, for example, where a logical backup is generated (e.g., utilizing pg_dump command), the plurality of files are generated by converting the logical backup into a plurality of column-oriented data format files.

At S350, a database data backup is generated. In an embodiment, the data backup is generated based on the plurality of data files. In some embodiments, the data backup includes a timestamp, a version identifier, and the like, which indicate a date, a time, a combination thereof, and the like, at which the data backup was generated. In an embodiment, the data backup is utilized in restoring a database.

In some embodiments, the data backup includes a data structure, such as metadata of the database, a data schema of the database, table data, a store procedure, a view, a combination thereof, and the like. In an embodiment, database data (e.g., schema, views, store procedures, etc.) are extracted from a dump, for example utilizing pg_dump, without storing the data itself. Thus, a pg_dump command can be utilized to generate the data files (e.g., Parquet files) and is also utilized to generate the machine backup, e.g., by extracting the metadata of the database, including views, store procedures, schema, etc.

It should be noted that a data backup is not the same as a storage backup. In a storage backup, a block-for-block copy of the storage device is created, which includes the database data and also includes a lot of data which is not useful for the actual database application, such as temporary files. It is therefore advantageous to store a backup only of the data of the database, without all the unnecessary files, folders, etc., which are not essential for the database to function properly.

In certain embodiments, a machine backup is generated, which includes data of the machine which is utilized to deploy the database application. Restoring a machine backup to a machine allows deployment of a machine which functions as the original machine, sans the data of the database. Once the data of the database application is written there, the machine is fully restored and functional.

In an embodiment, a machine backup is generated as a file-level backup, as a block-level backup, as a product key store, a combination thereof, and the like. The figures below discuss in more detail the generation of a machine backup utilizing various methods, and the restoration of a machine (e.g., restoring a virtualization instance) based on each such backup type.

In an embodiment, a machine backup includes data, information, and the like, which is utilized in restoring a machine. In some embodiments, restoring a machine includes generating a new machine according to the parameters of the original machine hosting the database.

Figure 4:
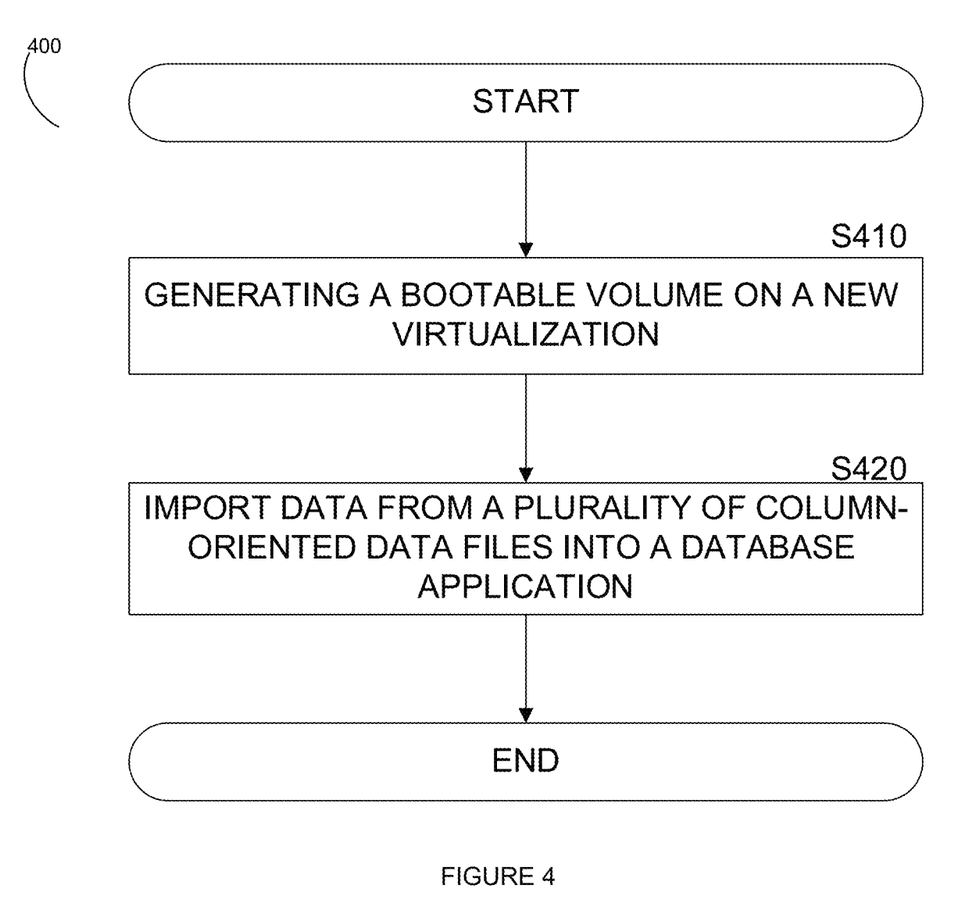
FIG. 4 is an example flowchart of a method for restoring a database from a file-level backup, implemented according to an embodiment.

FIG. 4 is an example flowchart 400 of a method for restoring a database from a file-level backup, implemented according to an embodiment. The method may be performed by the backup system 140.

At S410, a bootable volume is generated. In an embodiment, the bootable volume is generated in a cloud computing environment. For example, in an embodiment, a bootable volume is a Microsoft® Azure Managed Disk, a GCP Persistent Disk, an AWS Elastic Block Store (EBS), and the like.

In an embodiment, the bootable volume is an empty bootable machine volume, which includes only, for example, an operating system and configuration files which are required to boot a virtual machine, compute instance, and the like.

In some embodiments, file system files, application files, configuration files, and the like, are stored in a backup from the original machine (i.e., the machine, workload, etc., from which the backup is generated) and are copied into the bootable volume.

At S420, data is imported into the bootable volume. In an embodiment, the data is imported from a plurality of column-oriented data format files. In certain embodiments, importing data includes reading a plurality of files and writing data from the plurality of files into a database application deployed on the bootable volume. In an embodiment, importing data into the bootable volume includes utilizing an insert command based on a plurality of rows stored in a column-oriented data format file (e.g., a Parquet file). In some embodiments, a column-oriented data format file is converted to a logical backup, for example, by converting a Parquet file into a pg_dump file, and restoring the logical backup (e.g., using pg_restore in this example) into the database application.

Figure 5:
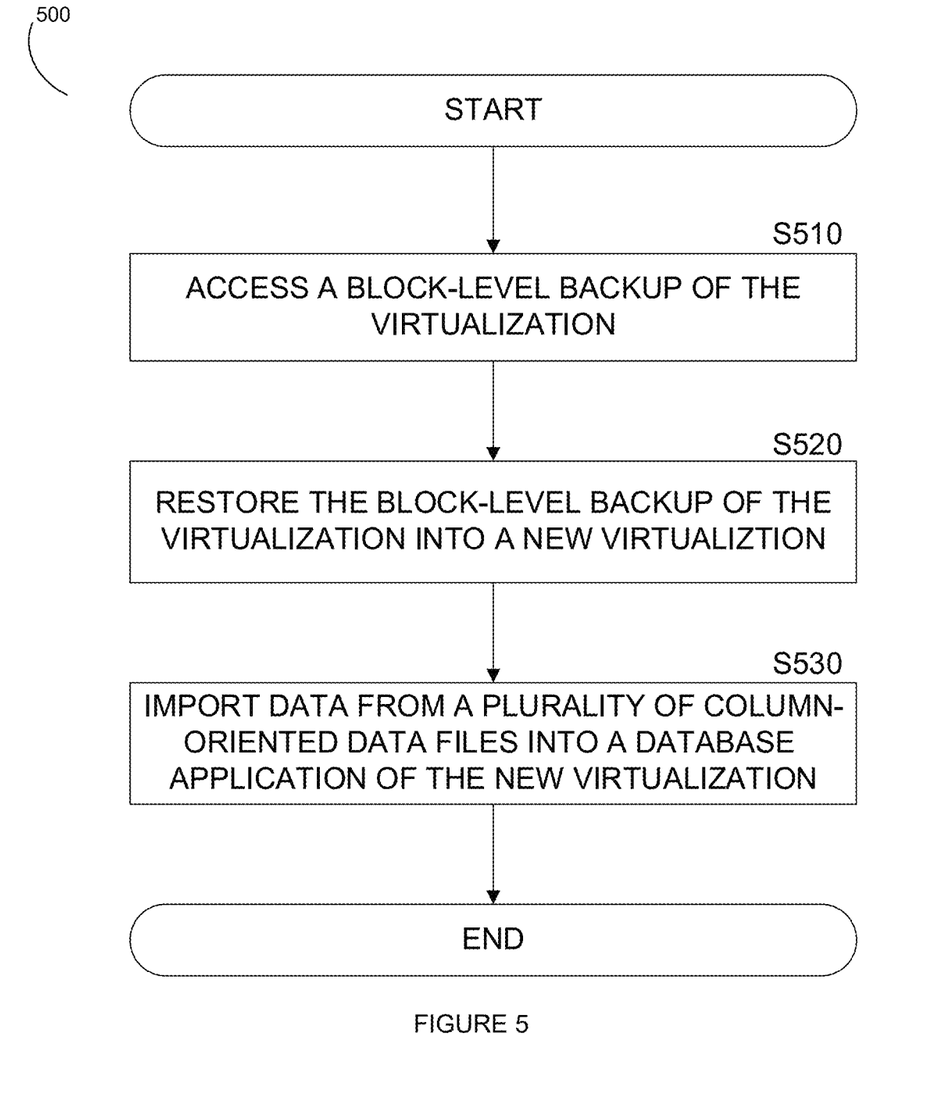
FIG. 5 is an example flowchart of a method for restoring a block-level database backup, implemented in accordance with an embodiment.

FIG. 5 is an example flowchart 500 of a method for restoring a block-level database backup, implemented in accordance with an embodiment. The method may be performed by the backup system 140.

At S510, a block-level backup is accessed. In an embodiment, the block-level backup includes storage blocks which are not used for storing data of the database application (i.e., tables, rows, etc.). According to an embodiment, a block-level backup is accessed by accessing a file, a storage device, a cloud storage platform, a combination thereof, and the like, which allow access to the block-level backup. In some embodiments, a credential, a token, etc., is received (for example in response to a generated request) in order to access the block-level backup.

In an embodiment, the block-level backup is generated by initiating a block-level backup of a block device and releasing the blocks which are associated with data files of the virtualization instance. For example, in an embodiment, a table is dropped from the block-level backup, a file where a table is stored is zeroed out, etc. In an embodiment, dropping a table from a database application includes erasing all records (i.e., all data rows), deleting indexes, triggering permissions, etc., breaking foreign key constraints, releasing storage space assigned to the table, a combination thereof, and the like.

In some embodiments, a plurality of block-level backups are available, each corresponding to a different version of a backup. In an embodiment, a version is selected for restoring a machine.

At S520, the block-level backup is restored. In an embodiment, restoring a block-level backup to a new machine includes restoring a block device based on the block-level backup. In an embodiment, a block device is a Microsoft® Azure Managed Disk, a GCP Persistent Disk, an AWS Elastic Block Store (EBS), and the like. In some embodiments, the block device includes a filesystem (e.g., NTFS).

At S530, data is imported into the block device. In an embodiment, the data is imported from a plurality of column-oriented data format files. In certain embodiments, importing data includes reading a plurality of files and writing data from the plurality of files into a database application deployed on the restored device.

In an embodiment, importing data into the bootable volume includes utilizing an insert command based on a plurality of rows stored in a column-oriented data format file (e.g., a Parquet file). In some embodiments, a column-oriented data format file is converted to a logical backup, for example, by converting a Parquet file into a pg_dump file, and restoring the logical backup (e.g., using a pg_restore command in this example) into the database application.

Figure 6:
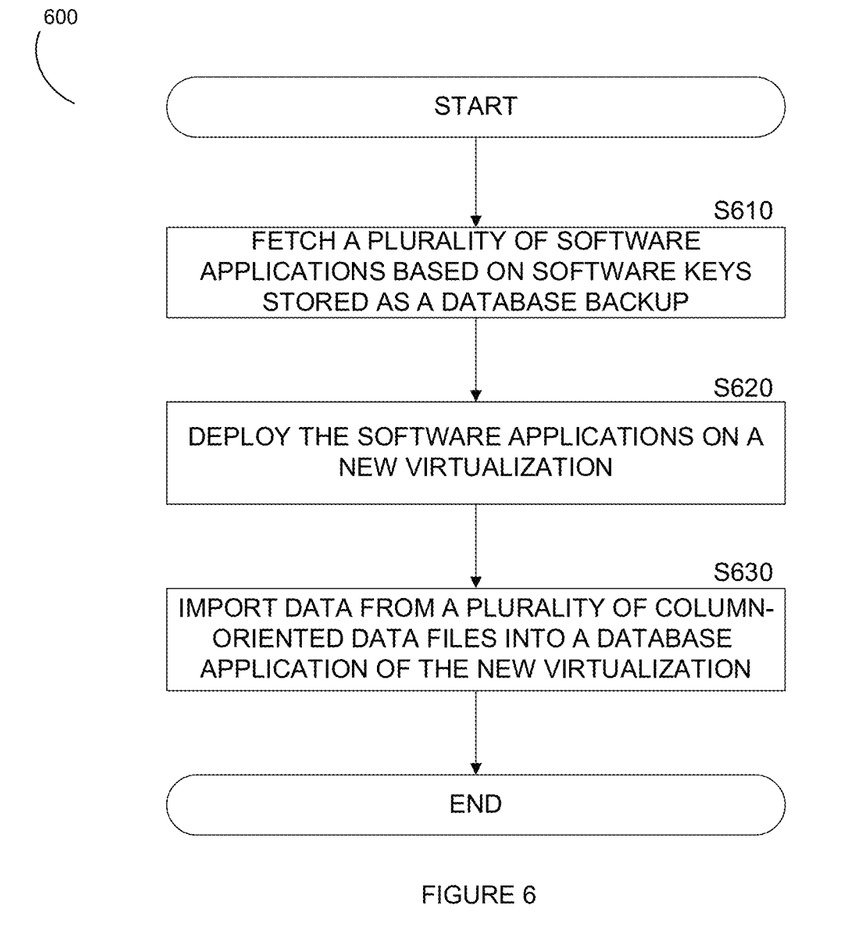
FIG. 6 is an example flowchart of a method for restoring a database based on a product key backup, implemented in accordance with an embodiment.

FIG. 6 is an example flowchart 600 of a method for restoring a database based on a product key backup, implemented in accordance with an embodiment. The method may be performed by the backup system 140.

In an embodiment, a product key is detected on a machine, virtualization, and the like, on which a database application is deployed. In an embodiment, the product key is detected by scanning the virtualization, performing static analysis on a snapshot of the virtualization, a combination thereof, and the like. In some embodiments, a plurality of product keys are detected on a virtualization. In an embodiment, the product keys are stored as a backup of the virtualization, such that it is possible to restore the virtualization based on the stored product keys, where the restored virtualization is capable of deploying a database application.

At S610, a plurality of product keys are fetched. In an embodiment, fetching the plurality of product keys includes detecting a plurality of software applications, each corresponding to a product key, deployed on a virtualization on which a database application is deployed.

In some embodiments, a group of product keys all correspond to a single software application, each product key corresponding to a unique version of the product key. In an embodiment, only a most recent product key is stored. In some embodiments, every detected product key is stored as a virtualization backup.

At S620, a software application is deployed. In an embodiment, the software application is deployed on a virtualization which is generated by configuring an orchestrator to generate a machine which is capable of executing the software associated with the product key. In an embodiment, such a virtualization constitutes a rebuilt machine and is implemented, for example, as a virtual machine, a software container, a serverless function, a combination thereof, and the like.

In some embodiments, deploying a software application includes installing binaries, libraries, and the like, which the software application requires for execution. In an embodiment, a version of the software is deployed based on a product key. In certain embodiments, a plurality of product keys each correspond to a version of the software. In some embodiments, a single key of the plurality of product keys is utilized to deploy only the most recent (or up-to-date) version of the software.

Deploying software in this manner assures that the database software is kept up to date, and does not include any vulnerabilities, misconfigurations, etc., even when the data which is being restored corresponds to a point in time where the database application had a previous version, which has since been replaced by a new version.

For example, a database application is Microsoft® Access version 2206 in a first backup, and version 2409 in a subsequent version. In an embodiment, it is advantageous to restore data from the first backup (i.e., when the application was version 2206) and restore the database application to version 2409, to avoid any vulnerability, misconfiguration, and the like, which is associated with version 2206.

At S630, data is imported into the rebuilt machine. In an embodiment, the data is imported from a plurality of column-oriented data format files. In certain embodiments, importing data includes reading a plurality of files and writing data from the plurality of files into a database application deployed on the restored device.

In an embodiment, importing data into the bootable volume includes utilizing an insert command based on a plurality of rows stored in a column-oriented data format file (e.g., a Parquet file). In some embodiments, a column-oriented data format file is converted to a logical backup, for example, by converting a Parquet file into a pg_dump file, and restoring the logical backup (e.g., using pg_restore in this example) into the database application.

Figure 7:
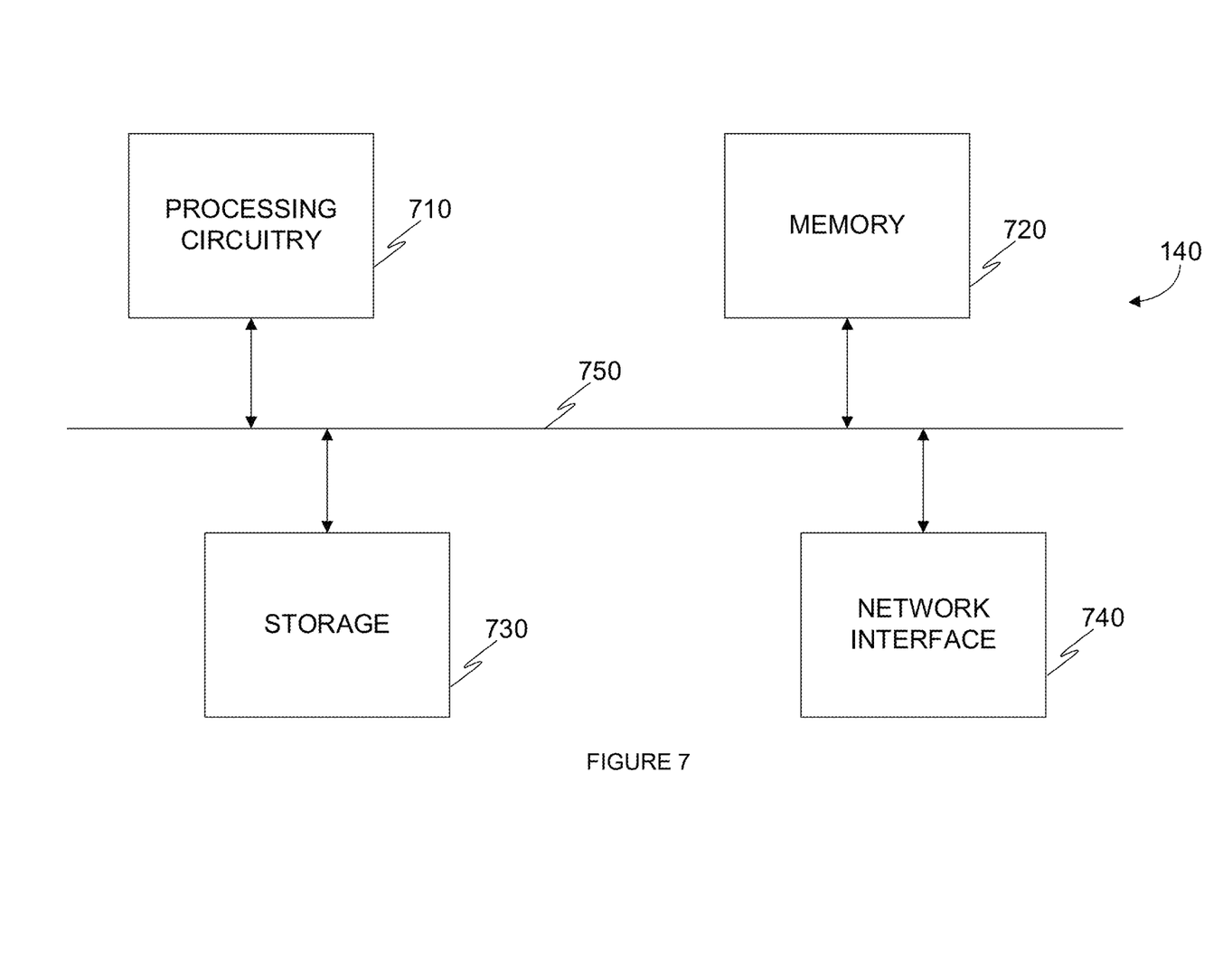
FIG. 7 is an example schematic diagram of a backup system according to an embodiment.

FIG. 7 is an example schematic diagram of a backup system 140 according to an embodiment. The backup system 140 includes, according to an embodiment, a processing circuitry 710 coupled to a memory 720, a storage 730, and a network interface 740. In an embodiment, the components of the backup system 140 are communicatively connected via a bus 750.

In certain embodiments, the processing circuitry 710 is realized as one or more hardware logic components and circuits. For example, according to an embodiment, illustrative types of hardware logic components include field programmable gate arrays (FPGAs), application-specific integrated circuits (ASICs), Application-specific standard products (ASSPs), system-on-a-chip systems (SOCs), graphics processing units (GPUs), tensor processing units (TPUs), Artificial Intelligence (AI) accelerators, general-purpose microprocessors, microcontrollers, digital signal processors (DSPs), and the like, or any other hardware logic components that are configured to perform calculations or other manipulations of information.

In an embodiment, the memory 720 is a volatile memory (e.g., random access memory, etc.), a non-volatile memory (e.g., read-only memory, flash memory, etc.), a combination thereof, and the like. In some embodiments, the memory 720 is an on-chip memory, an off-chip memory, a combination thereof, and the like. In certain embodiments, the memory 720 is a scratch-pad memory for the processing circuitry 710.

In one configuration, software for implementing one or more embodiments disclosed herein is stored in the storage 730, in the memory 720, in a combination thereof, and the like. Software shall be construed broadly to mean any type of instructions, whether referred to as software, firmware, middleware, microcode, hardware description language, or otherwise. Instructions include, according to an embodiment, code (e.g., in source code format, binary code format, executable code format, or any other suitable format of code). The instructions, when executed by the processing circuitry 710, cause the processing circuitry 710 to perform the various processes described herein, in accordance with an embodiment.

In some embodiments, the storage 730 is a magnetic storage, an optical storage, a solid-state storage, a combination thereof, and the like, and is realized, according to an embodiment, as a flash memory, as a hard-disk drive, another memory technology, various combinations thereof, or any other medium which can be used to store the desired information.

The network interface 740 is configured to provide the backup system 140 with communication with, for example, the network 130, workload 110, database application 120, etc., according to an embodiment.

It should be understood that the embodiments described herein are not limited to the specific architecture illustrated in FIG. 7, and other architectures may be equally used without departing from the scope of the disclosed embodiments.

The various embodiments disclosed herein can be implemented as hardware, firmware, software, or any combination thereof. Moreover, the software is preferably implemented as an application program tangibly embodied on a program storage unit or computer-readable medium consisting of parts, or of certain devices and/or a combination of devices. The application program may be uploaded to, and executed by, a machine comprising any suitable architecture. Preferably, the machine is implemented on a computer platform having hardware such as one or more processing units ("PUs"), a memory, and input/output interfaces. The computer platform may also include an operating system and microinstruction code. The various processes and functions described herein may be either part of the microinstruction code or part of the application program, or any combination thereof, which may be executed by a PU, whether or not such a computer or processor is explicitly shown. In addition, various other peripheral units may be connected to the computer platform such as an additional data storage unit and a printing unit. Furthermore, a non-transitory computer-readable medium is any computer-readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to the first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method for generating a digital backup of a database application hosted on a virtual machine, comprising:
   accessing a database application hosted on a virtual machine, the virtual machine deployed in a computing environment;
   exporting data stored in the database application to a plurality of files, each file utilizing a column-oriented storage format;
   generating a virtualization backup only of the virtual machine; and
   generating a data backup of the database application based on the plurality of files.

2. The method of claim 1, wherein generating the virtualization backup further comprises:
   generating a storage-based snapshot of the virtual machine;

mounting the snapshot to another virtual machine; and
generating the virtualization backup as a file-level backup.

3. The method of claim 2, further comprising:
generating the virtualization backup without the data of the database application.

4. The method of claim 3, further comprising:
generating a bootable volume on a new virtual machine; and
restoring the virtualizing backup in the bootable volume.

5. The method of claim 4, further comprising:
importing data from the plurality of files into the bootable volume.

6. The method of claim 1, further comprising:
generating a block-level backup of the virtual machine;
detecting a plurality of storage blocks on which data of the database application is stored; and
releasing the detected plurality of storage blocks.

7. The method of claim 6, further comprising:
restoring the block-level backup of the virtual machine into a new virtual machine; and
importing data from the plurality of files into the new virtual machine.

8. The method of claim 6, further comprising:
zeroing out table data prior to initiating the block-level backup.

9. The method of claim 1, further comprising:
detecting a plurality of software product keys on the virtual machine; and
storing the detected plurality of software product keys as the backup of the virtual machine.

10. The method of claim 9, further comprising:
initializing a new virtual machine;
detecting a plurality of software applications, each software application corresponding to a software product key;
deploying each of the plurality of software applications on the new virtual machine; and
restoring the data backup into the new virtual machine.

11. The method of claim 10, further comprising:
determining that a software application corresponding to a software product key has an updated version; and
deploying the updated version of the software application on the new virtual machine.

12. The method of claim 1, further comprising:
detecting a metadata of the database application; and
generating the digital backup of the database application further based on the detected metadata.

13. The method of claim 12, wherein the metadata includes any one of: a schema, a store procedure, a view, and any combination thereof.

14. The method of claim 1, wherein exporting data stored in the database application further comprises:
generating a plurality of queries;
executing the plurality of queries to receive a plurality of results; and
generating a file of the plurality of files based at least on a result of the plurality of results.

15. The method of claim 14, further comprising:
determining a primary key of the database application; and
generating the plurality of queries based at least on the primary key.

16. The method of claim 1, wherein exporting data stored in the database application further comprises:
generating a logical backup; and
converting the logical backup into the plurality of files.

17. A non-transitory computer-readable medium storing a set of instructions for generating a digital backup of a database application hosted on a virtual machine, the set of instructions comprising:
one or more instructions that, when executed by one or more processors of a device, cause the device to:
access a database application hosted on a virtual machine, the virtual machine deployed in a computing environment;
export data stored in the database application to a plurality of files, each file utilizing a column-oriented storage format
generate a virtualization backup only of the virtual machine; and
generate a data backup of the database application based on the plurality of files.

18. A system for generating a digital backup of a database application hosted on a virtual machine comprising:
one or more processors configured to:
access a database application hosted on a virtual machine, the virtual machine deployed in a computing environment;
export data stored in the database application to a plurality of files, each file utilizing a column-oriented storage format
generate a virtualization backup only of the virtual machine; and
generate a data backup of the database application based on the plurality of files.

19. The system of claim 18, wherein the one or more processors, when generating the virtualization backup, are configured to:
generate a storage-based snapshot of the virtual machine;
mount the snapshot to another virtual machine; and
generate the virtualization backup as a file-level backup.

20. The system of claim 19, wherein the one or more processors are further configured to:
generate the virtualization backup without the data of the database application.

21. The system of claim 20, wherein the one or more processors are further configured to:
generate a bootable volume on a new virtual machine; and
restore the virtualizing backup in the bootable volume.

22. The system of claim 21, wherein the one or more processors are further configured to:
import data from the plurality of files into the bootable volume.

23. The system of claim 18, wherein the one or more processors are further configured to:
generate a block-level backup of the virtual machine;
detect a plurality of storage blocks on which data of the database application is stored; and
release the detected plurality of storage blocks.

24. The system of claim 23, wherein the one or more processors are further configured to:
restore the block-level backup of the virtual machine into a new virtual machine; and
import data from the plurality of files into the new virtual machine.

25. The system of claim 23, wherein the one or more processors are further configured to:
zero out table data prior to initiating the block-level backup.

26. The system of claim 18, wherein the one or more processors are further configured to:
detect a plurality of software product keys on the virtual machine; and store the detected plurality of software product keys as the backup of the virtual machine.

27. The system of claim 26, wherein the one or more processors are further configured to:
initialize a new virtual machine;
detect a plurality of software applications, each software application corresponding to a software product key;
deploy each of the plurality of software applications on the new virtual machine; and
restore the data backup into the new virtual machine.

28. The system of claim 27, wherein the one or more processors are further configured to:
determine that a software application corresponding to a software product key has an updated version; and
deploy the updated version of the software application on the new virtual machine.

29. The system of claim 18, wherein the one or more processors are further configured to:
detect a metadata of the database application; and
generate the digital backup of the database application further based on the detected metadata.

30. The system of claim 29, wherein the metadata includes any one of:
a schema, a store procedure, a view, and any combination thereof.

31. The system of claim 18, wherein the one or more processors, when exporting data stored in the database application, are configured to:
generate a plurality of queries;
execute the plurality of queries to receive a plurality of results; and
generate a file of the plurality of files based at least on a result of the plurality of results.

32. The system of claim 31, wherein the one or more processors are further configured to:
determine a primary key of the database application; and
generate the plurality of queries based at least on the primary key.

33. The system of claim 18, wherein the one or more processors, when exporting data stored in the database application, are configured to:
generate a logical backup; and
convert the logical backup into the plurality of files.

* * * * *